United States Patent
Sibbach et al.

(10) Patent No.: US 12,044,182 B2
(45) Date of Patent: Jul. 23, 2024

(54) SHAFT POWER TRANSFER FOR A MULTI SPOOL GAS TURBINE ENGINE

(71) Applicant: General Electric Company, Schenectady, NY (US)

(72) Inventors: Arthur William Sibbach, Boxford, MA (US); Brandon Wayne Miller, Liberty Township, OH (US); Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 17/844,863

(22) Filed: Jun. 21, 2022

(65) Prior Publication Data
US 2023/0407795 A1 Dec. 21, 2023

(51) Int. Cl.
*F02C 7/36* (2006.01)
(52) U.S. Cl.
CPC ........ *F02C 7/36* (2013.01); *F05D 2260/4023* (2013.01)
(58) Field of Classification Search
CPC ..... F01D 15/12; F02C 7/36; F05D 2260/4023
See application file for complete search history.

(56) References Cited

U.S. PATENT DOCUMENTS

| | | | |
|---|---|---|---|
| 8,350,398 B2 * | 1/2013 | Butt | F02C 7/36 290/52 |
| 8,534,074 B2 * | 9/2013 | Copeland | F02C 7/36 60/39.163 |
| 10,570,824 B2 | 2/2020 | Schwarz et al. | |
| 10,738,709 B2 * | 8/2020 | Forest | F02C 7/32 |
| 10,823,082 B2 | 11/2020 | Boniface | |
| 10,830,102 B2 | 11/2020 | Martin et al. | |
| 10,954,865 B2 | 3/2021 | Mackin | |
| 11,053,019 B2 | 7/2021 | Mackin | |
| 11,248,523 B2 * | 2/2022 | Leque | F02C 7/32 |
| 2020/0284201 A1 * | 9/2020 | Gebhard | F02C 3/10 |
| 2021/0123534 A1 | 4/2021 | Mackin | |
| 2022/0010848 A1 | 1/2022 | Morales et al. | |

* cited by examiner

*Primary Examiner* — Justin D Seabe
(74) *Attorney, Agent, or Firm* — Dority & Manning, P.A.

(57) ABSTRACT

A shaft power transfer system includes a first mechanical clutch mechanism operably coupling a high-pressure shaft to a low-pressure shaft. The first mechanical clutch mechanism transfers power from the high-pressure shaft to the low-pressure shaft at a predefined first speed transient condition. The system further includes a second mechanical clutch mechanism that operably couples the low-pressure shaft to the high-pressure shaft. The second mechanical clutch mechanism transfers power from the low-pressure shaft to the high-pressure shaft at a predefined second speed transient condition where the predefined first speed transient condition is different than the predefined second speed transient condition.

20 Claims, 4 Drawing Sheets

SHAFT POWER TRANSFER FOR A MULTI SPOOL GAS TURBINE ENGINE

FIELD

The present disclosure relates to a system for transferring power between shafts of a multi spool gas turbine engine.

BACKGROUND

Gas turbine engines, such as turbofan engines, may be used for aircraft propulsion. A turbofan engine generally includes a high-pressure spool, and a low-pressure spool. In operation, respective shafts of the high-pressure spool and the low-pressure spool generally rotate at different speeds. The inventors of the present disclosure have found that transferring limited power between the respective shafts of the low-pressure spool and the high-pressure spool during certain operating transient conditions would be beneficial in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
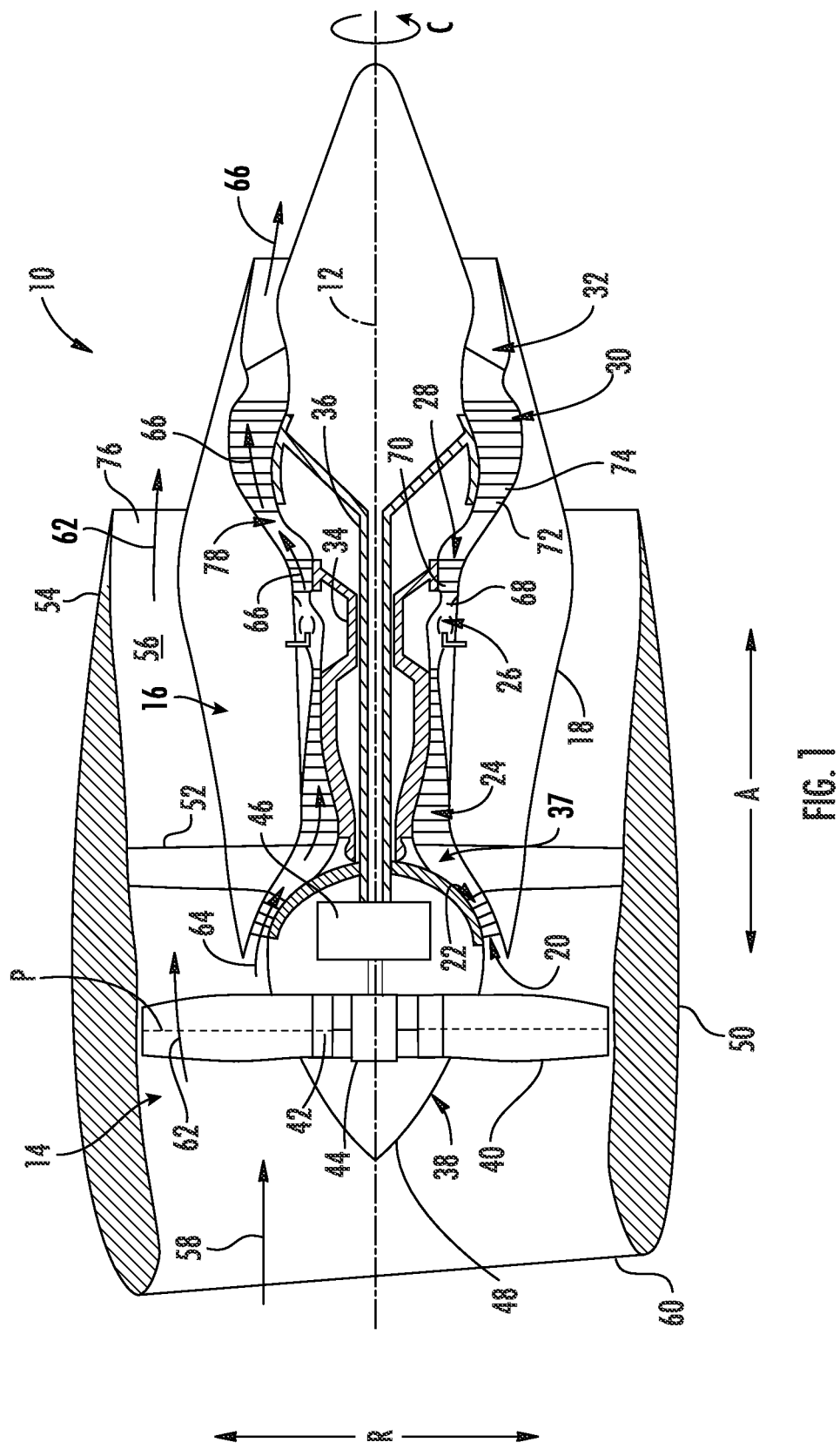
FIG. 1 is a cross-sectional view of a gas turbine engine in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet and aft refers to a position closer to an engine nozzle or exhaust.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "first", "second", and "third" may be used interchangeably to distinguish one component from another and are not intended to signify location or importance of the individual components.

It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The present disclosure is generally related to a multi-spool gas turbine engine that incorporates one or more passive overrun clutches, such as one or more sprag clutches, to facilitate transferring limited power between respective shafts of the spools during various engine transient operational conditions. The overrun or sprag clutches are implemented such that a first overrun or sprag clutch transfers power from the first spool shaft to the second spool shaft at one operating condition. A second overrun or sprag clutch may transfer power from the second spool shaft to the first spool shaft at a second operating condition.

Additional clutches, actuators or other control devices may be incorporated to facilitate the ability to actively control when the overrun or sprag clutches are engaged/disengaged. One or more speed change devices may also be incorporated to match the rotational speeds of the high-pressure and low-pressure spool shafts to effect power transfer at a desired transient condition. Additionally, the speed change devices may address issues with the two spool shafts rotating in opposite directions. The clutch assemblies may further include but are not limited to electromechanical clutches, disk clutches, or torque limiters.

This configuration enables bi-directional power transfer between the high-pressure spool shaft and the low-pressure spool shaft of a gas turbine engine by mechanical means using overrun or sprag clutches. The use of mechanical clutches is more efficient than the use of electrical motor generators to transfer power between respective spool shafts, particularly when considering the entire system weight including cooling and power conditioning systems. The clutch system disclosed herein may be engaged to connect the low-pressure and high-pressure shafts together as part of a bowed rotor mitigation system.

Referring now to the drawings, wherein identical numerals indicate the same elements throughout the figures, FIG. 1 is a cross-sectional side view of a gas turbine engine 10 in accordance with an exemplary embodiment of the present disclosure. More particularly, for the embodiment of FIG. 1, the gas turbine engine 10 is a multi-spool, high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes an engine casing 18 that defines an annular core inlet 20. The engine casing 18 at least partially encases a high-pressure spool and a low-pressure spool. In serial flow relationship, a compressor section including a booster or low-pressure LP compressor 22 and a high-pressure HP compressor 24; a combustion section 26; a turbine section including a high-pressure HP turbine 28 and a low-pressure LP turbine 30; and a jet exhaust nozzle section 32.

The high-pressure spool includes a high-pressure HP shaft 34 that drivingly connects the HP turbine 28 to the HP compressor 24. The low-pressure spool includes a low-pressure LP shaft 36 that drivingly connects the LP turbine 30 to the LP compressor 22. The compressor section, combustion section 26, turbine section, and jet exhaust nozzle section 32 together define a working gas flow path 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison.

The gas turbine engine 10 further includes a power gear box 46. The fan blades 40, disk 42, and pitch change mechanism 44 are together rotatable about the longitudinal centerline 12 by the LP shaft 36 across the power gear box 46. The power gear box 46 includes a plurality of gears for adjusting a rotational speed of the fan 38 relative to a rotational speed of the LP shaft 36, such that the fan 38 and the HP turbine shaft 36 may rotate at more efficient relative speeds.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially spaced outlet guide vanes 52 in the embodiment depicted. Moreover, a downstream section 54 of the nacelle 50 extends over an outer portion of the turbomachine 16 to define a bypass airflow passage 56 therebetween.

It should be appreciated, however, that the exemplary gas turbine engine 10 depicted in FIG. 1 is provided by way of example only, and that in other exemplary embodiments, the gas turbine engine 10 may have other configurations. For example, although the gas turbine engine 10 depicted is configured as a ducted gas turbine engine (i.e., including the outer nacelle 50), in other embodiments, the gas turbine engine 10 may be an unducted or non-ducted gas turbine engine (such that the fan 38 is an unducted fan, and the outlet guide vanes 52 are cantilevered from the engine casing 18).

Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 is directed or routed into the working gas flow path 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of high-pressure (HP) turbine stator vanes 68 that are coupled to a turbine casing and high-pressure (HP) turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of low-pressure (LP) turbine stator vanes 72 that are coupled to a turbine casing and low-pressure (LP) turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

Figure 2:
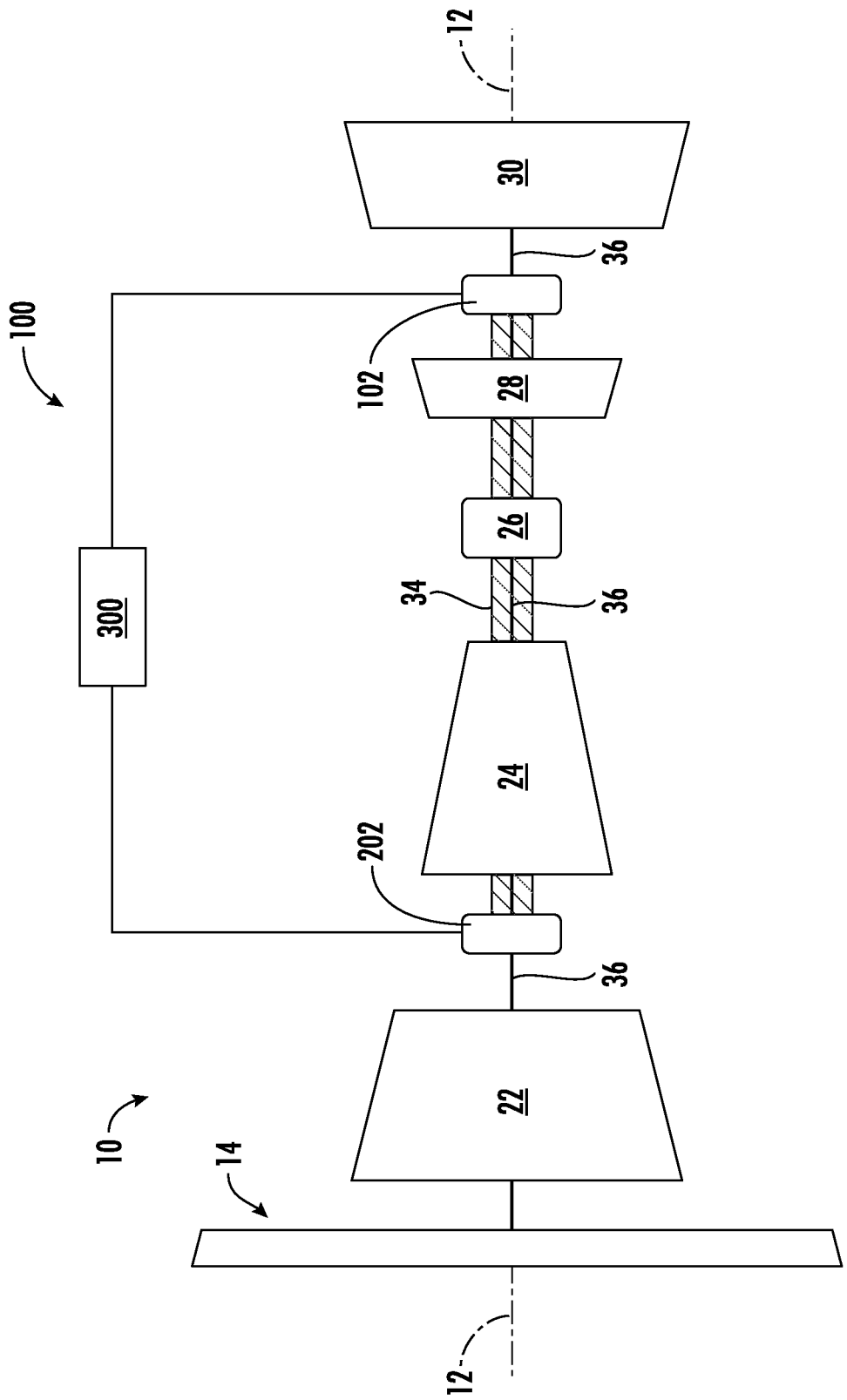
FIG. 2 provides a schematic view of a portion of a turbomachine according to an exemplary embodiment of the present disclosure.

FIG. 2 is a schematic view of a portion of an exemplary turbomachine 16 of the exemplary gas turbine engine 10 show in FIG. 1. FIG. 2 depicts, in serial flow order, the fan section 14, the LP compressor 22, the HP compressor 24, the combustion section 26, the HP turbine 28 and the LP turbine 30. FIG. 2 further depicts the HP shaft 34 drivingly connecting the HP turbine 28 to the HP compressor 24, and the LP shaft 36 drivingly connecting the LP turbine 30 to the LP compressor 22. As shown, the LP shaft 36 and the HP shaft 34 may be coaxially aligned with respect to longitudinal centerline 12. As such, the LP shaft 36 may extend through/within the HP shaft 34.

In an exemplary embodiment, as illustrated in FIG. 2, the turbomachine 16 includes a power transfer system 100 herein denoted as system 100. The system 100 includes a first mechanical clutch mechanism 102 such as a sprag or other overrun type clutch, and a second mechanical clutch mechanism 202 such as a sprag or other overrun type clutch. In certain embodiments, at least one of the first mechanical clutch mechanism 102 and the second mechanical clutch mechanism 202 is a passive clutch. In certain embodiments, at least one of the first mechanical clutch mechanism 102 and the second mechanical clutch mechanism 202 is a one-way clutch.

The first mechanical clutch mechanism 102 is operably coupled to the HP shaft 34 to the LP shaft 36 and is configured to transfer power from the HP shaft 34 to the LP shaft 36 during predefined operating speeds or transient conditions of the HP shaft 34 and the LP shaft 36. For example, a sprag clutch will allow power to be transferred between two rotational devices, such as the HP shaft 34 to the LP shaft 36, when the driving member is attempting to rotate faster than the driven member. When the driven members speed exceeds that of the driving member, the sprag clutch passively disengages. The second mechanical clutch mechanism 202 is operably coupled to the LP shaft 36 and to the HP shaft 34 and is configured to transfer power from the LP shaft 36 to the HP shaft 34 during predefined operating speeds or engine transient conditions of the LP shaft 36 and the HP shaft 34.

As one example, the first mechanical clutch mechanism 102 may transfer power from the HP shaft 34 to the LP shaft 36 as the engine transitions from idle speed to take-off speed or during any other predetermined acceleration transient condition. The power will be transferred from the HP shaft 34 to the slower running LP shaft 36 until the HP shaft 34 and the LP shaft 36 reach a predetermined relative or common rotational speed at which time the first mechanical clutch mechanism 102 will disengage, thereby allowing the LP shaft 36 to rotate at a first desired rotational speed while allowing the HP shaft 34 to rotate at a second faster rotational speed with respect to the speed of the LP shaft 36. This ensures that the LP shaft 36 is accelerating at a desired rate at predetermined operating conditions such as startup, acceleration from idle to takeoff, and sudden increases in power while in flight.

Oppositely, as the engine transitions to a slower speed, such as, from a nominal or full speed operating condition to a predetermined deceleration transient condition, the second mechanical clutch mechanism 202 may transfer power from the LP shaft 36 to the HP shaft 34 until the LP shaft 36 and the HP shaft 34 reach a predetermined relative or common rotational speed at which time the second mechanical clutch mechanism 202 will disengage, thereby allowing the LP shaft 36 and the HP shaft 34 to rotate at different relative rotational speeds.

Figure 3:
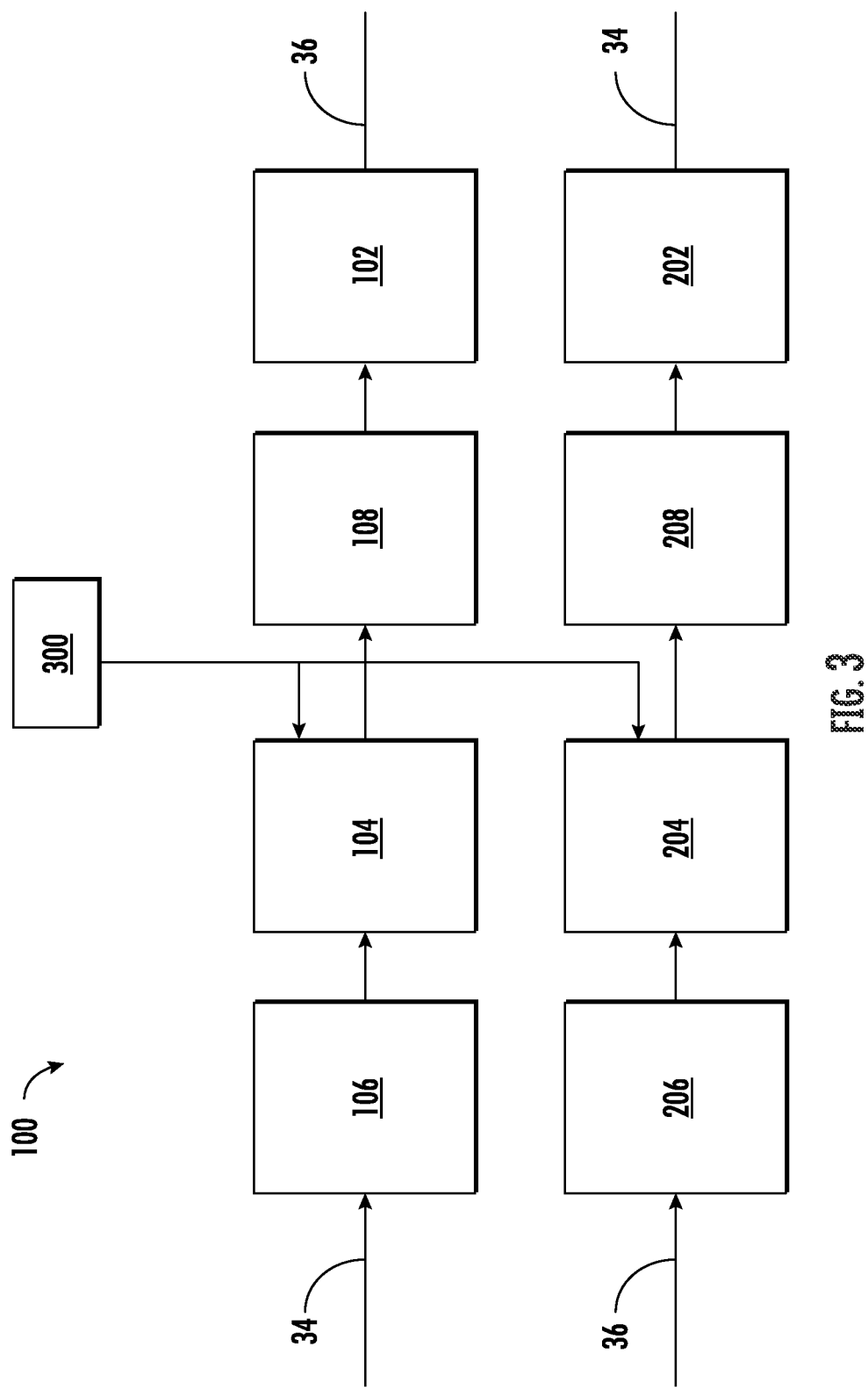
FIG. 3 provides a schematic representation of a power transfer system for a gas turbine engine according to exemplary embodiments of the present disclosure.

FIG. 3 is a schematic view of the system 100 according to various embodiments of the present disclosure. In certain embodiments, as shown in FIG. 3, the system 100 includes an engagement clutch 104 coupled to the HP shaft 34 and electronically connected to an engine controller 300. Engagement clutch 104 may be any one or any combination of an electrically, hydraulically, or pneumatically actuated clutch. In certain embodiments, the system 100 includes a centrifugal clutch 106 coupled to the HP shaft 34. The centrifugal clutch 106 may be positioned operably forward of the engagement clutch 104 or operably aft of the engagement clutch 104. In certain embodiments, the system 100 includes a shaft speed change device 108, such as a gearbox (fixed ration or multiple selectable ratios) or a continuous variable transmission (CVT). As shown in FIG. 3, the shaft speed change device 108 may be positioned operably between the engagement clutch 104 and the first mechanical clutch mechanism 102.

In response to the engine controller 300 receiving a throttle command to increase engine rotor speed and/or engine thrust, engagement clutch 104 may be engaged via an input signal from the engine controller 300. The speed reduction gears match the shaft speed ratio between the HP shaft 34 and the LP shaft 36 within a desired range of engine operation, such as an HP shaft speed of 60-90% of nominal HP shaft target operating speed. The first mechanical clutch mechanism 102 (overrunning or sprag clutch), automatically disengages the HP and LP shafts 34, 36, respectively, at a point where the driven shaft speed exceeds the shaft speed of the driving shaft when multiplied by the gear ratio. The centrifugal clutch 106 can optionally be designed to automatically engage the HP Shaft 34 and the LP shaft 36 at a minimum speed point of the driving shaft, without the need for the engagement clutch 104. This system 100 thereby facilitates the transfer of power from a driving shaft to a driven shaft between a defined range of speeds that can be governed on the low end by the centrifugal clutch 106, and on the high end by the first mechanical clutch 102. The optional engagement clutch 104 can be directed to enable or disable this system such that it is only used under specific operating conditions, examples of which might be an emergency acceleration of a standby engine, or when an operating engine fails.

In certain embodiments, in addition or in the alternative, the system 100 includes an engagement clutch 204 coupled to the LP shaft 36 and electronically connected to the engine controller 80. Engagement clutch 204 may be any one or any combination of an electrically, hydraulically, or pneumatically actuated clutch. In certain embodiments, the system 100 includes a centrifugal clutch 206 coupled to the LP shaft 36. The centrifugal clutch 206 may be positioned operably forward of the engagement clutch 204 or operably aft of the engagement clutch 204. In certain embodiments, the system 100 includes a shaft speed change device 208, such as a gearbox or a continuous variable transmission (CVT). As shown in FIG. 3, the shaft speed change device 208 may be positioned operably between the engagement clutch 204 and the second mechanical clutch mechanism 202.

In response to the engine controller 300 receiving a throttle command to decrease engine rotor speed and/or engine thrust, engagement clutch 204 may be engaged via an input signal from the engine controller 300. In this operating condition, the speed reduction gears match the shaft speed ratio between the HP shaft 34 and the LP shaft 36 within a desired range of engine operation, such as an HP shaft 34 speed of 60-90% of nominal HP shaft 34 target operating speed. In an emergency situation, it may be desirable to reduce the speed of a shaft faster than would nominally occur under normal operating conditions where the HP and LP shafts 34, 36 respectively, are not mechanically engaged with each other. In conjunction with a reduction in fuel flow, by actuating engagement clutch (104/204), the system 100 may place additional drag on the desired shaft, resulting in the shaft speed reducing faster than under nominal operating conditions.

Figure 4:
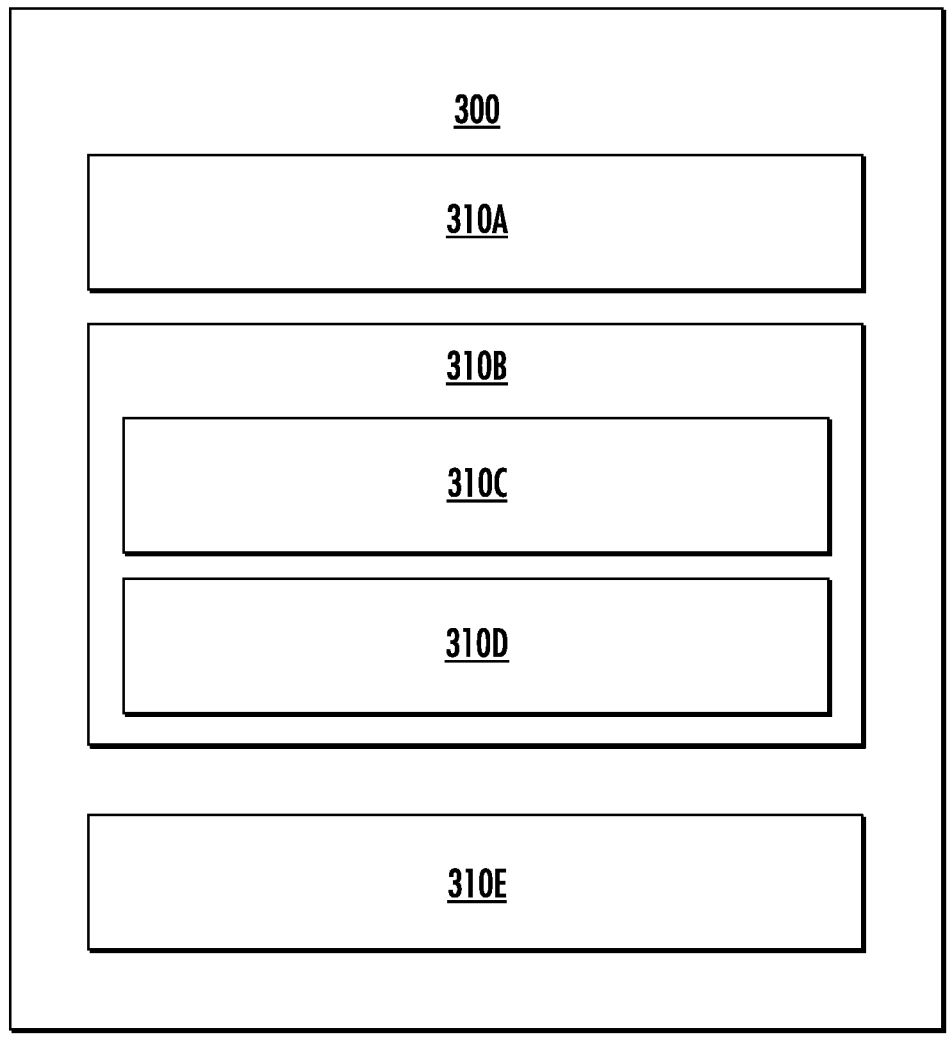
FIG. 4 provides a system diagram of an engine controller of the gas turbine engine of FIG. 1 according to example embodiments of the present disclosure.

FIG. 4 provides a system diagram of the engine controller 300. As shown, the engine controller 300 can include one or more processor(s) 310A and one or more memory device(s) 310B. The one or more processor(s) 310A can include any processing device, such as a microprocessor, microcontroller, integrated circuit, logic device, and/or other suitable processing device. The one or more memory device(s) 310B can include one or more computer-readable media, including, but not limited to, non-transitory computer readable medium, RAM, ROM, hard drives, flash drives, and/or other memory devices.

The one or more memory device(s) 310B can store information accessible by the one or more processor(s) 310A, including computer-executable or computer-readable instructions 310C that can be executed by the one or more processor(s) 310A. The instructions 310C can be any set of instructions that when executed by the one or more processor(s) 310A, cause the one or more processor(s) 310A to perform operations, such as engage or disengage the engagement clutches 104, 204 (FIG. 3). The instructions 310C can be software written in any programming language or can be implemented in hardware or firmware. Additionally, and/or alternatively, the instructions 310C can be executed in logically and/or virtually separate threads on processor(s) 310A. The memory device(s) 310B can further store data 310D that can be accessed by the processor(s) 310A.

The engine controller 300 can also include a network interface 310E used to communicate, for example, with the other components of the system 100 (FIG. 2) (e.g., via a network). The network interface 310E can include components for interfacing with one or more network(s), including, for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A shaft power transfer system, comprising: a first mechanical clutch mechanism operably coupling a high-pressure shaft to a low-pressure shaft, where the first mechanical clutch mechanism transfers power from the high-pressure shaft to the low-pressure shaft at a predefined first speed transient condition; and a second mechanical clutch mechanism operably coupling the low-pressure shaft to the high-pressure shaft, where the second mechanical clutch mechanism transfers power from the low-pressure shaft to the high-pressure shaft at a predefined second speed transient condition, and where the first speed transient condition is different than the second speed transient condition.

The shaft power transfer system of the preceding clause, wherein the first speed transient condition is an acceleration transient condition, and wherein the second speed transient condition is a deceleration transient condition.

The shaft power transfer system of any preceding clause, wherein the first mechanical clutch mechanism is a sprag clutch or overrun clutch.

The shaft power transfer system of any preceding clause, wherein the second mechanical clutch mechanism is an overrun clutch.

The shaft power transfer system of any preceding clause, wherein the second mechanical clutch mechanism is a sprag clutch.

The shaft power transfer system of any preceding clause, further comprising a shaft speed change device operably coupled to the high-pressure shaft.

The shaft power transfer system of any preceding clause, further comprising a shaft speed change device operably coupled to the low-pressure shaft.

The shaft power transfer system of any preceding clause, further comprising an engagement clutch operably coupled to the high-pressure shaft and electronically connected to an engine controller.

The shaft power transfer system of any preceding clause, wherein the engagement clutch includes at least one of an electrically, hydraulically, or pneumatically actuated clutch.

The shaft power transfer system of any preceding clause, further comprising a centrifugal clutch operably coupled to the high-pressure shaft.

The shaft power transfer system of any preceding clause, further comprising an engagement clutch operably coupled to the low-pressure shaft and electronically connected to an engine controller.

The shaft power transfer system of any preceding clause, wherein the engagement clutch includes at least one of an electrically, hydraulically, or pneumatically actuated clutch.

The shaft power transfer system of any preceding clause, further comprising a centrifugal clutch operably coupled to the low-pressure shaft.

A gas turbine engine, comprising: a high-pressure shaft drivingly coupled to a high-pressure compressor and a high-pressure turbine; a low-pressure shaft drivingly coupled to a low-pressure compressor, a low-pressure turbine, and a fan; a first mechanical clutch mechanism operably coupling the high-pressure shaft to the low-pressure shaft, wherein the first mechanical clutch mechanism transfers power from the high-pressure shaft to the low-pressure shaft at a predefined first speed transient condition of the gas turbine engine, wherein the first mechanical clutch mechanism is an overrun clutch; and a second mechanical clutch mechanism operably coupling the low-pressure shaft to the high-pressure shaft, wherein the second mechanical clutch mechanism transfers power from the low-pressure shaft to the high-pressure shaft at a predefined second speed transient condition, wherein the first speed transient condition is different than the second speed transient condition of the gas turbine engine, and wherein the second mechanical clutch mechanism is an overrun clutch.

The gas turbine engine of the preceding clause, wherein the first speed transient condition is an acceleration transient condition, and wherein the second speed transient condition is a deceleration transient condition.

The gas turbine engine of any preceding clause, wherein the second mechanical clutch mechanism is a sprag clutch.

The gas turbine engine of any preceding clause, further comprising at least one shaft speed change device operably coupled to at least one of the high-pressure shaft and the low-pressure shaft.

The gas turbine engine of any preceding clause, further comprising at least one engagement clutch operably coupled to at least one of the high-pressure shaft and the low-pressure shaft.

The gas turbine engine of any preceding clause, further comprising a centrifugal clutch operably coupled to the high-pressure shaft.

The gas turbine engine of any preceding clause, further comprising a centrifugal clutch operably coupled to the low-pressure shaft.

We claim:

1. A shaft power transfer system, comprising:
a first mechanical clutch mechanism operably coupling a high-pressure shaft to a low-pressure shaft, wherein the first mechanical clutch mechanism transfers power from the high-pressure shaft to the low-pressure shaft at a predefined first speed transient condition; and
a second mechanical clutch mechanism operably coupling the low-pressure shaft to the high-pressure shaft, wherein the second mechanical clutch mechanism transfers power from the low-pressure shaft to the high-pressure shaft at a predefined second speed transient condition, wherein the predefined first speed transient condition is different than the predefined second speed transient condition.

2. The shaft power transfer system of claim 1, wherein the predefined first speed transient condition is an acceleration transient condition, and wherein the predefined second speed transient condition is a deceleration transient condition.

3. The shaft power transfer system of claim 1, wherein the first mechanical clutch mechanism is a sprag clutch.

4. The shaft power transfer system of claim 1, wherein the second mechanical clutch mechanism is an overrun clutch.

5. The shaft power transfer system of claim 1, wherein the second mechanical clutch mechanism is sprag clutch.

6. The shaft power transfer system of claim 1, further comprising a shaft speed change device operably coupled to the high-pressure shaft.

7. The shaft power transfer system of claim 1, further comprising a shaft speed change device operably coupled to the low-pressure shaft.

8. The shaft power transfer system of claim 1, further comprising an engagement clutch operably coupled to the high-pressure shaft and electronically connected to an engine controller.

9. The shaft power transfer system of claim 8, wherein the engagement clutch includes at least one of an electrically, hydraulically, or pneumatically actuated clutch.

10. The shaft power transfer system of claim 8, further comprising a centrifugal clutch operably coupled to the high-pressure shaft.

11. The shaft power transfer system of claim 1, further comprising an engagement clutch operably coupled to the low-pressure shaft and electronically connected to an engine controller.

12. The shaft power transfer system of claim 11, wherein the engagement clutch includes at least one of an electrically, hydraulically, or pneumatically actuated clutch.

13. The shaft power transfer system of claim 11, further comprising a centrifugal clutch operably coupled to the low-pressure shaft.

14. A gas turbine engine, comprising:
a high-pressure shaft drivingly coupled to a high-pressure compressor and a high-pressure turbine;
a low-pressure shaft drivingly coupled to a low-pressure compressor, a low-pressure turbine, and a fan;
a first mechanical clutch mechanism operably coupling the high-pressure shaft to the low-pressure shaft, wherein the first mechanical clutch mechanism transfers power from the high-pressure shaft to the low-pressure shaft at a predefined first speed transient condition of the gas turbine engine, wherein the first mechanical clutch mechanism is an overrun clutch; and
a second mechanical clutch mechanism operably coupling the low-pressure shaft to the high-pressure shaft, wherein the second mechanical clutch mechanism transfers power from the low-pressure shaft to the high-pressure shaft at a predefined second speed transient condition, wherein the predefined first speed transient condition is different than the predefined second speed transient condition of the gas turbine engine, and wherein the second mechanical clutch mechanism is an overrun clutch.

15. The gas turbine engine of claim 14, wherein the predefined first speed transient condition is an acceleration transient condition, and wherein the predefined second speed transient condition is a deceleration transient condition.

16. The gas turbine engine of claim 14, wherein the second mechanical clutch mechanism is a sprag clutch.

17. The gas turbine engine of claim 14, further comprising at least one shaft speed change device operably coupled to at least one of the high-pressure shaft and the low-pressure shaft.

18. The gas turbine engine of claim 14, further comprising at least one engagement clutch operably coupled to at least one of the high-pressure shaft and the low-pressure shaft.

19. The gas turbine engine of claim 18, further comprising a centrifugal clutch operably coupled to the high-pressure shaft.

20. The gas turbine engine of claim 18, further comprising a centrifugal clutch operably coupled to the low-pressure shaft.

* * * * *